United States Patent [19]
Dalton, Jr. et al.

[11] Patent Number: 5,522,424
[45] Date of Patent: Jun. 4, 1996

[54] CONTROLLING THE FLOW OF FLUIDS USING SOLENOID-ACTUATED VALVES

[75] Inventors: Richard L. Dalton, Jr., Temple; William C. Klebusch; Andreas A. Weiss, both of Nashua, all of N.H.

[73] Assignee: LDI Pneutronics Corporation, Hollis, N.H.

[21] Appl. No.: 157,828

[22] Filed: Nov. 24, 1993

[51] Int. Cl.⁶ .......................... F16K 11/044; F16K 31/06
[52] U.S. Cl. .................. 137/560; 137/625.5; 137/884; 251/129.07; 251/129.19; 251/337
[58] Field of Search .................. 251/129.19, 337, 251/77, 129.07; 137/884, 560, 625.27, 625.5

[56] References Cited

U.S. PATENT DOCUMENTS

| | | | |
|---|---|---|---|
| 2,698,159 | 12/1959 | Crum | 251/129.19 |
| 3,303,854 | 2/1967 | Churchill | 137/625.65 |
| 3,827,672 | 8/1974 | Stampfli . | |
| 3,970,282 | 7/1976 | Hansen | 251/129.19 X |
| 4,102,526 | 7/1978 | Hargraves . | |
| 4,245,815 | 1/1981 | Willis . | |
| 4,298,027 | 11/1981 | Neff | 137/625.65 |
| 4,352,532 | 10/1982 | Hardin | 137/884 X |
| 4,557,292 | 12/1985 | Nicolas et al. | 137/884 X |
| 4,608,208 | 8/1986 | Yogo et al. | 251/337 X |
| 4,635,683 | 1/1987 | Nielsen . | |
| 4,664,136 | 5/1987 | Everett . | |
| 4,954,799 | 9/1990 | Kumar . | |
| 5,139,227 | 8/1992 | Sumida et al. | 251/129.19 X |
| 5,209,455 | 5/1993 | Uetsuhara et al. | 251/129.19 |
| 5,222,524 | 6/1993 | Sekler et al. | 137/884 |
| 5,232,196 | 8/1993 | Hutchings et al. . | |
| 5,234,033 | 8/1993 | Stoll et al. | 137/884 |
| 5,269,490 | 12/1993 | Fujikawa et al. | 137/884 X |

FOREIGN PATENT DOCUMENTS

0574735A1  12/1993  European Pat. Off. .

*Primary Examiner*—John Rivell
*Attorney, Agent, or Firm*—Fish & Richardson

[57] ABSTRACT

The invention features a coupler that is substantially disposed around an armature, and is constructed to provide an axial force-transmitting relationship between a carrier and the armature for blocking and unblocking the passage of fluids between the first and second passages. The force-transmitting relationship is characterized by the carrier being capable of axial movement relative to the armature, while the carrier substantially following the motion of the armature for both blocking and unblocking the passage of fluids between the first and second passages. The coupler includes coaxially nested coupling and blocking springs that provide equal spring forces and are removed from the direct passage of fluid between the first and second fluid passages. The solenoid is reversible in orientation such that the electrical connectors can be situated on either the manifold face, or 180° on the opposite face.

25 Claims, 4 Drawing Sheets

CONTROLLING THE FLOW OF FLUIDS USING SOLENOID-ACTUATED VALVES

BACKGROUND

This invention relates to the control of fluids using solenoid-actuated valves.

Solenoid-actuated valves operate by supplying a known quantity of current through a solenoid that generates a magnetic field. The magnetic field attracts a movable internal element of the valve that selectively blocks or unblocks the flow of fluid through the valve. These valves are intended to operate accurately and efficiently to produce a controlled fluid flow between two or more fluid flow passages.

Conventional valve designs typically have a spring for one valve seat, typically normally open, sufficient in force to seal against a required pressure, and a second spring for the opposite valve seat, typically normally closed, sufficient in force to both seal against a required pressure and to overcome the force of the opposite (normally open) spring. Typically, the normally closed spring must provide more force than the normally open spring. This requires stronger and perhaps heavier springs, as well as a larger solenoid to overcome the force of the larger normally closed spring.

Typical valves that employ internal springs also have one or both springs located in the path of fluid flow, therefore the media that the valve controls can act to wear or corrode the springs. Other valves generally isolate the springs from the active flow path with a diaphragm or protective barrier.

There are many applications for fluid control valves in for example, the medical, chemical and semiconductor industries, such as, in chemical analysis, filtration, pumping systems, and gas delivery equipment. The cost associated with each cubic meter of building space has made it highly advantageous to reduce the size of the equipment employed in these industries.

SUMMARY

In one aspect, the invention relates to a solenoid-actuated valve that includes: a solenoid that has an axially extending coil defining a solenoid cavity; a valve body that has a first fluid passage, a second fluid passage, and a valve seat between the first and second passages; an armature positioned within the cavity, the armature being at least in part axially movable within the cavity; a carrier for blocking and unblocking the passage of fluids between the first and second passages; and a coupler substantially disposed around the armature and constructed to provide force transmission between the carrier and the armature. The solenoid moves the armature for selectively controlling the flow of fluids through the passages by movement of the carrier toward and away from the valve seat in response to a force-transmitting relationship between the armature and the carrier.

This aspect of the invention features a coupler that provides an axial force-transmitting relationship between the carrier and the armature for blocking and unblocking the passages of fluids between the first and second passages. The force-transmitting relationship is characterized by the carrier being capable of axial movement relative to the armature, while the carrier substantially following the motion of the armature for both blocking and unblocking the passage of fluids between the first and second passages.

The coupler, between the carrier and the armature, is substantially disposed around the armature, and thus the valve occupies a small volume. Small fluid control devices can be employed in such applications as portable medical equipment in which smaller and lighter equipment may transported more easily.

In other embodiments of the invention, the coupler features a coupling spring for coupling the motion of the carrier and the armature at least in one axial direction, and a blocking spring. The coupling spring supplies force for unblocking the passage of fluids, and the blocking spring supplies force for blocking the passage of fluids. The coupling and blocking springs do not oppose the force-transmission of each other. The coupling and blocking springs are substantially coaxial, and one spring is nested inside the other spring. The coupling and blocking springs are preferably formed from wound wire and the winds for each of the springs are in opposite directions. The spring forces provided by the coupling and blocking springs may be equal or unequal. The coupler is removed from the direct passage of fluid between the first and second passages.

The internal assembly allows the normally open (coupling) and the normally closed (blocking) springs to be employed such that their force tolerances do not accumulate. The springs do not oppose or work against each other in either normally open or normally closed sealing modes. The spring forces required to seal the normally closed and open the normally open valve seats may be same. This allows for the valve to operate more efficiently and with lower internal forces.

In another aspect, the invention features a solenoid-actuated valve that has the electrical and fluid ports constructed and arranged so that upon connection of the valve to a source of electrical energy the valve becomes simultaneously connected to the fluid ports (a source and receiver of fluid).

In another general aspect, the invention relates to an apparatus for controlling the flow of fluids that includes: a manifold that has plural ports, each for supplying and/or receiving fluid; an electrical connector constructed to couple a source of electrical energy to at least one electrical outlet; a solenoid-actuated valve that has an axially extending coil defining a solenoid cavity and has electrical leads constructed to connect to the electrical outlet.

This aspect features electrical and fluid ports that are constructed and arranged so that upon connection of the electrical leads to the outlet, the first and second fluid passages become simultaneously aligned with and fluidly connected to the supplying and receiving ports of the manifold, whereby the apparatus may control the flow of fluid through the first and second passages while occupying a small volume.

The valve design of the invention allows a secure electrical and pneumatic connection to be made with threaded fasteners. Both fluid and electrical connections can be made simultaneously as the mounting screws are secured.

The solenoid, in yet another aspect of the invention, is reversible in orientation such that the electrical connectors can be situated on either the manifold face, or 180° opposite thereto on the opposite face.

Other advantages and features will become apparent from the following description and from the claims.

DESCRIPTION OF PARTICULAR EMBODIMENTS

Figure 1:
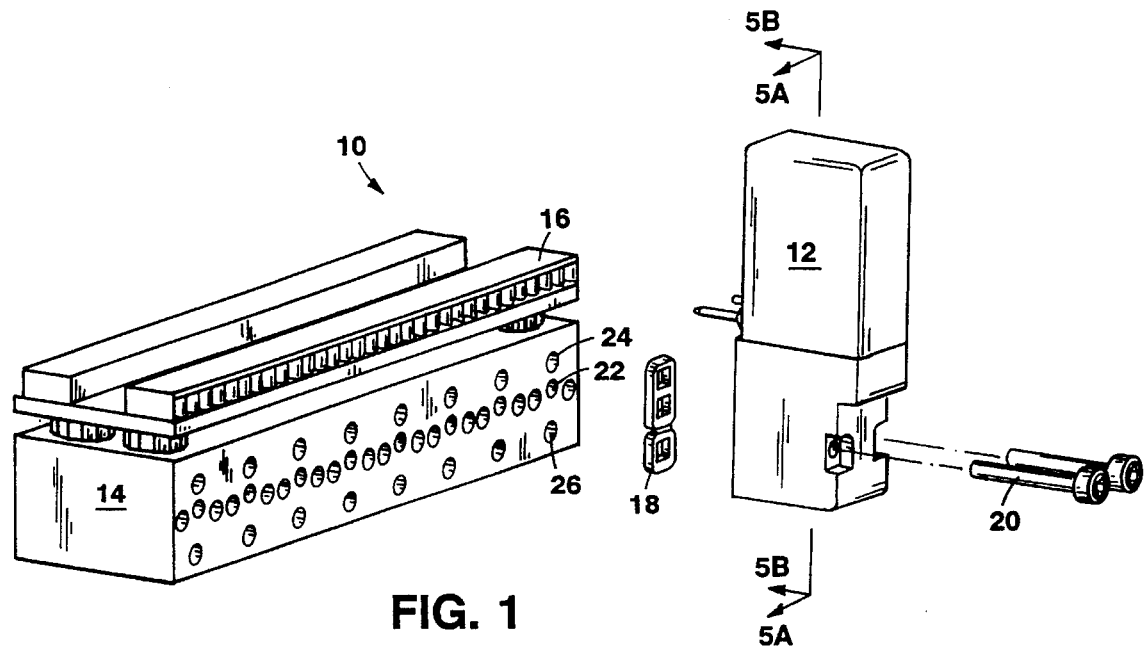
FIG. 1 is an exploded perspective view of a fluid control system according to the invention, including a solenoid-actuated valve, a manifold assembly, and a cable assembly.

Referring to FIG. 1, in a fluid control system 10 according to the invention, a solenoid-actuated valve 12 makes simultaneous electrical and pneumatic connections to a manifold 14 and a cable assembly 16. A mating elastomeric gasket 18 provides the seal between the manifold and the valve body. Mounting and sealing is provided by two screws 20. The physical geometry of the fluid control system is such that multiple valves 12 may be installed onto the manifold with minimal spacing requirements.

In operation, valve 12 controls the flow of viscous fluids (e.g., compressible fluids in the gaseous state). In the illustrated embodiment, valve 12 controls the pneumatic connection between a common port 22, and a normally open port 24 and a normally closed port 26. Electrical energy supplied through the cable assembly permits selective energization of valve 12.

The common port does not act to restrict fluid flow in either the energized or de-energized states of the solenoid. The common port, by means of internal cavities in the valve, forms a confluent flow path with the normally open and normally closed ports. When valve 12 is de-energized, the pneumatic connection to the common port is made with the normally open port; while when valve 12 is energized, the pneumatic connection to the common port is made with the normally closed port.

Figure 2:
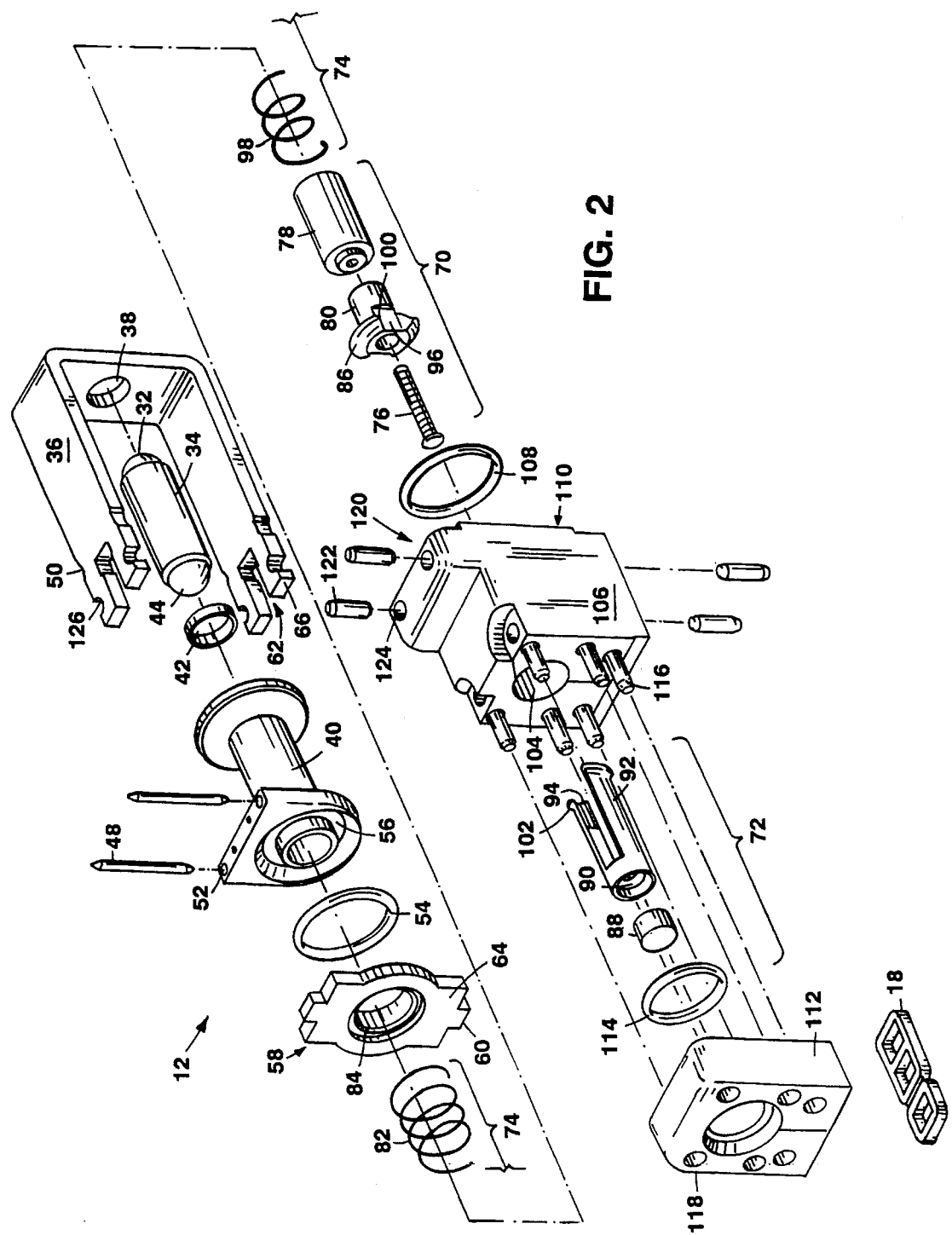
FIG. 2 is an exploded view of the solenoid-actuated valve of the system illustrated in FIG. 1.
Figure 3:
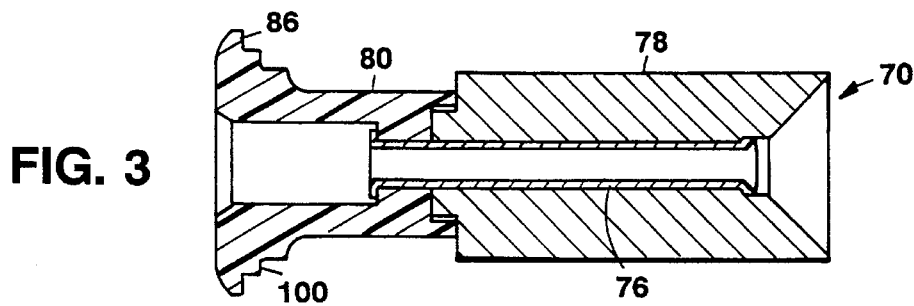
FIG. 3 is a cross-sectional side view of an armature assembly according to the invention.
Figure 3A:
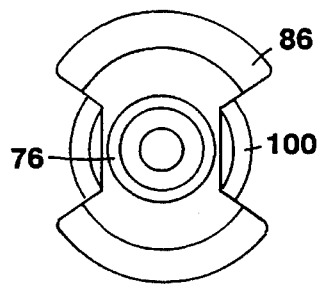
FIGS. 3A and 3B are top and bottom views, respectively, of the armature assembly shown in FIG. 3.
Figure 3B:
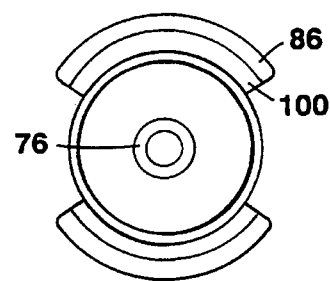
Figure 4:
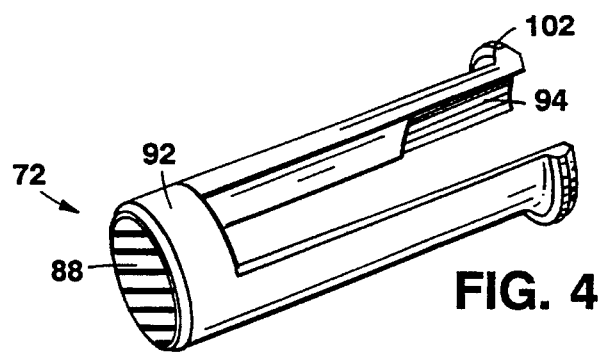
FIG. 4 is a perspective view of a poppet carrier according to the invention.
Figure 4A:
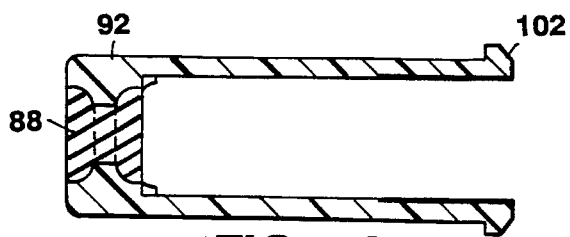
FIGS. 4A and 4B are horizontal and vertical cross-sectional views of the poppet carrier shown in FIG. 4.
Figure 4B:
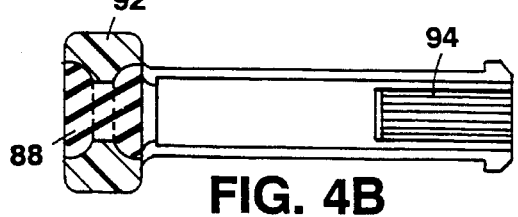
Figure 4C:
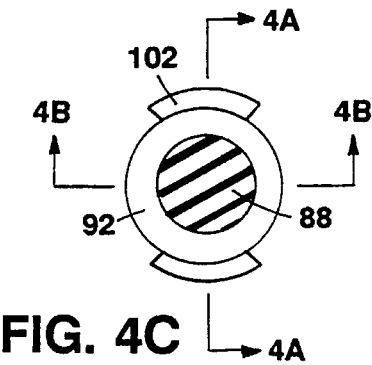
FIG. 4C is a bottom view of the poppet carrier shown in FIG. 4.

Referring to FIGS. 2–4, solenoid-actuated valve 12, according to the invention, includes a solenoid assembly 28 coupled to a pneumatic assembly 30.

Within the solenoid assembly, a distal end 32 of a pole piece 34 couples to a flux bracket 36 through an orifice 38. The pole piece fits inside a hollow bobbin 40. A pole piece seal 42 causes a proximal end 44 of the pole piece to frictionally engage the internal surface of bobbin 40. A cylindrical magnetic coil 46 (shown in FIGS. 5A and 5B) surrounds the bobbin in the completed assembly. The proximal end of the flux bracket couples to the proximal end of the bobbin by sliding electrical pins 48 through slots 50 in the bracket and into holes 52 that are molded into the proximal end of the bobbin.

An O-ring 54 sits inside a frusto-conical recess 56 at the proximal end of the flux bracket and abuts against a flux coupler 58. The flux coupler has tabs 60 that slide into slots 62 of the flux bracket and permit the proximal face 64 of the flux coupler to form a smooth continuous surface with the proximal end 66 of the flux bracket. The flux coupler concentrates and transmits magnetic flux when the solenoid is energized. Flux coupler 58 is fastened to flux bracket 36 by, for example, tig-welding.

An internal assembly 68 includes the moving elements of the solenoid-actuated valve. Within the internal assembly, an armature 70 has a unique coupled relationship with a carrier 72 by means of springs 74.

As shown in FIGS. 2–3, a stainless steel eyelet 76 is disposed in a longitudinal passage that extends through armature 70 and couples an electromagnetic plunger 78 to a thermoplastic spring cap 80 which together form armature 70. The armature is slidably received inside the hollow bore of bobbin 40. In operation, when the solenoid is energized, the armature is attracted to the proximal end 44 of the pole piece and moves toward the distal end with the pole piece.

In a preferred embodiment, the distal end of a frusto-conical compression spring 82, referred to herein as the normally closed or closing spring, sits inside an annular recess 84 in the proximal face 64 of the flux coupler. The proximal end of the normally closed spring abuts against a proximal outer annular lip 86 of spring cap 80. When the solenoid is energized, the normally closed spring becomes compressed as the armature moves toward the pole piece. The magneto-motive force of the energized solenoid must overcome the spring force of the normally closed spring to cause the armature to move toward the pole piece.

As shown in FIGS. 2 and 4, an elastomeric poppet 88 is securely nested within an orifice 90 in the proximal end of an axially elongated thermoplastic poppet carrier 92. On opposite faces of the distal portion of the poppet carrier there are longitudinal slots 94 that slidably receive the proximal end of spring cap 80 which has grooves 96 constructed and arranged to permit the internal surface of the poppet carrier to slide over the external surface of the spring cap.

A compression spring 98, referred to herein as the normally open or coupling spring, couples carrier 72 to armature 70, and is nested inside the normally closed spring. The direction of wind for each spring 82, 98 is opposite such to reduce the incidence of meshing or tangling during assembly or operation. The proximal end of the compression spring 98 abuts against an inner annular lip 100 of the spring cap, while the distal end of the normally open 98 spring abuts against a distal lip 102 of the poppet carrier. The normally open spring 98 causes the poppet carrier to substantially follow the motion of the armature during the energization of the solenoid because the proximal and distal ends of the spring are engaged between the annular lip 100 of the spring cap and the distal lip 102 of the poppet carrier.

The poppet carrier and the proximal portion of the armature are generally disposed within a cylindrical bore 104 inside a thermoplastic pneumatic housing 106. An O-ring 108 permits a sealing engagement between an annular recess in distal face 110 of the pneumatic housing and the proximal face 64 of the flux coupler.

A thermoplastic pneumatic end cap 112 completes the valve assembly. The end cap has an annular recess for receiving an O-ring 114 that forms a fluid seal between the distal face of the end cap and the proximal face of the pneumatic housing. Threaded fasteners 116 slide through holes 118 that extend through the end cap, and are used to couple the end cap to the housing.

The proximal end of the flux bracket slides into transverse slots 120 in the distal end of the pneumatic housing.

Threaded fasteners 122 slide through holes 124 in the housing and through slots 126 in the flux bracket to lock the bracket to the housing.

Figure 5A:
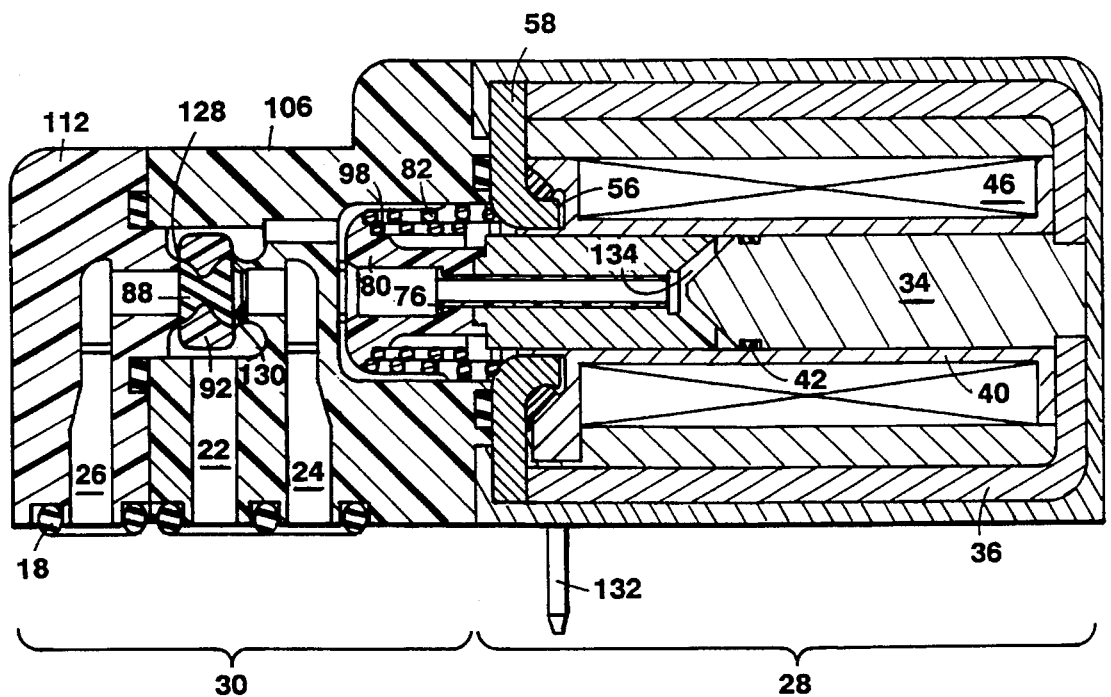
FIG. 5A is a cross-sectional view of the solenoid-actuated valve shown in FIG. 1, taken along the line 5A—5A.
Figure 5B:
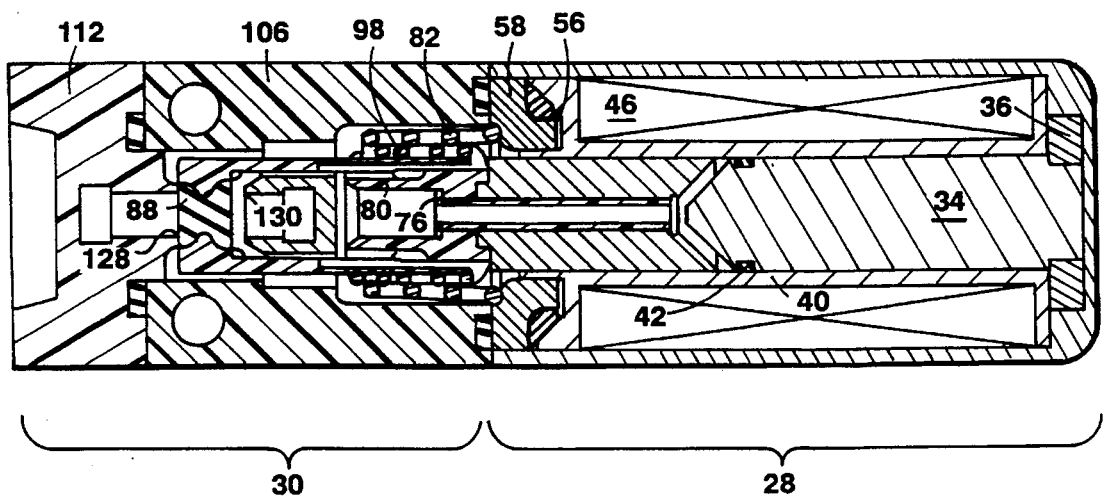
FIG. 5B is a cross-sectional view of the solenoid-actuated valve shown in FIG. 1, taken along the line 5B—5B.

Referring to FIGS. 5A and 5B, the common port, by means of internal cavities in the valve housing 106, forms a confluent flow path with the normally open and normally closed ports. Both the proximal and the distal valve faces of the elastomeric poppet 88 are constructed to form a seal with the normally open and the normally closed valve seats 128 and 130, respectively.

The elastomeric poppet shuttles between the valve seats as the solenoid is energized and de-energized by means of electrical pins 132 that exit the valve, in the illustrated embodiment, on the same valve face as the pneumatic ports 22–26. The normally closed valve seat 128, furthest from the solenoid, acts to restrict fluid flow during the de-energized state of the solenoid as the poppet seals against it. The normally closed port acts to supply fluid flow during the energized state of the solenoid. The normally open valve seat 130, closest to the solenoid, acts to supply fluid flow during the de-energized state of the solenoid. The normally open valve seat acts to restrict fluid flow during the energized state of the solenoid as the poppet seals against it.

When energized, the solenoid acts to generate an electromagnetic field across a working gap 134 that attracts armature 70 located within the field, and thereby causes the armature to move against pole piece 34 and overcome the spring force of normally closed spring 82. The normally closed spring is compressed between the outer lip 86 of the armature and proximal face 64 of the flux coupler of the solenoid assembly as the armature moves toward the pole piece. Normally open spring 98 keeps carrier 72 with armature 78, until the carrier poppet 88 interferes with the normally open valve seat 130. Valve 12 is constructed so that the poppet interferes with the normally open valve seat before the armature meets the pole piece. The force of the normally open spring forces the poppet against the normally open valve seat, thereby acting to restrict flow from the normally open port 24.

In the de-energized state of the solenoid, normally closed spring 82 pushes the armature away from the front pole piece and causes a circumferential lip on the armature to contact the distal end of carrier 72 and push the carrier away from the solenoid under the force of normally closed spring 82. As the carrier is pushed away from the front pole piece, elastomeric poppet 88 makes contact with normally closed valve seat 128 and acts to restrict the flow of fluid from the normally closed port. The poppet force on the normally closed valve seat is thus derived from the normally open spring.

The internal assembly allows the normally open and the normally closed springs to be employed such that their force tolerances do not accumulate. The springs in valve 12 do not oppose or work against each other in either normally open or normally closed sealing modes. Therefore the normally closed spring does not need to provide more force than the normally open spring. In this design, the spring forces required to seal the normally closed and the normally open valve seats may be same. This allows for the valve to operate more efficiently and with lower internal forces.

Conventional valve designs typically have a spring for one valve seat, typically normally open, sufficient in force to seal against a required pressure, and a second spring for the opposite valve seat, typically normally closed, sufficient in force to both seal against a required pressure and to overcome the force of the opposite (normally open) spring. Typically, the normally closed spring must provide more force than the normally open spring.

The location of both springs is also unique to this design. The normally open valve seat spring is nested inside of the normally closed valve seat spring. Because the springs are nested together, the internal volume required for both springs is reduced.

The physical location of both the normally open and the normally closed springs within the valve is removed from the direct path of fluid flow, therefore they are not subject to the fluid abrasion or fluid particulate wear. The poppet carrier allows the springs to be remote of the active fluid path.

Figure 6:
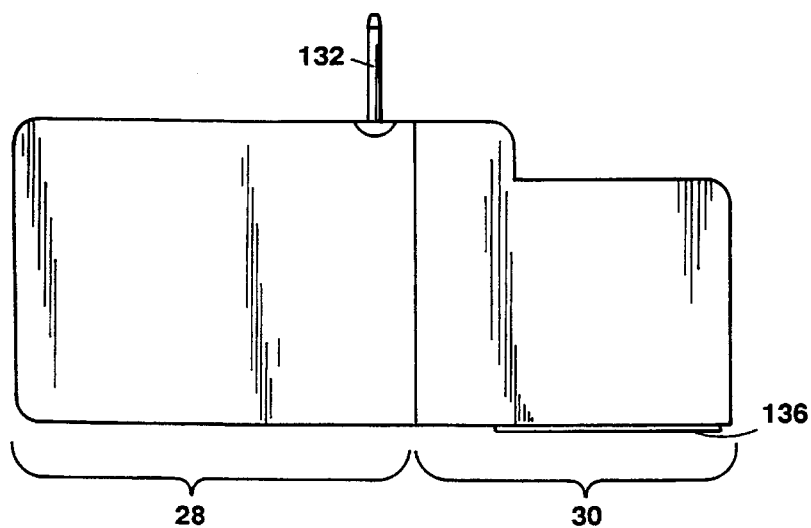
FIG. 6 is an external profile view of the solenoid-actuated valve according to the invention with the solenoid body rotated 180°.

As shown in FIG. 6, the solenoid is reversible in orientation which allows the valve to be easily configured during fabrication so that the electrical pins 132 may be situated on the opposite face as the pneumatic ports on the manifold face 136. Thus, in FIG. 5A, the entire solenoid, assembly 28 can be rotated 180° around the solenoid axis to yield the fully operative valve illustrated in FIG. 6 wherein the electrical connections are on a side of the valve opposite to the location of ports 22, 24, 26. This feature permits the valve to be easily manufactured to accommodate a wide range of situations.

The internal configuration of valve 12 is also compatible with other types of fluid control systems (for example, combustion systems, regulator valves, bottling valves and dispensing valves), and is not limited to manifolds.

Other embodiments are within the scope of the claims.

What is claimed is:

1. A solenoid-actuated valve comprising:

a solenoid having an axially extending solenoid cavity;

a valve body having a first fluid passage, a second fluid passage, and a third fluid passage, said second and third fluid passages being fluidly coupled to said first fluid passage through first and second valve seats, respectively;

an axially elongated armature positioned within said cavity, said armature being at least in part axially movable within said cavity;

a carrier having an end movable against the first and second valve seats for selectively blocking the passage of fluids therepast;

a closing spring coupled between said valve body and said armature, said closing spring providing sufficient force to said armature to seal said first valve seat with the end of said carrier when said solenoid is de-energized; and a coupling spring coupled between said carrier and said armature, said coupling spring providing sufficient force to said carrier to seal said second valve seat with the end of said carrier when said solenoid is energized;

wherein said solenoid moves said armature for selectively controlling the flow of fluids between said first and second passages and between said first and third passages.

2. The valve of claim 1 wherein said coupling spring and said closing spring do not oppose the force-transmission of each other.

3. The valve of claim 1 wherein said coupling spring and said closing spring are substantially coaxial, and at least a portion of one of said springs is nested inside the other of said springs.

4. The valve of claim 1 wherein the coupling spring and the closing spring are adjacent to one another, said coupling spring and said closing spring comprise wound wire, and the windings of said springs are in opposite directions.

5. The valve of claim 1 wherein the spring forces provided by said coupling spring and said closing spring are about the same.

6. The valve of claim 1 wherein said coupling spring and said closing spring are removed from the direct passage of fluid between said first and second passages and are removed from the direct passage of fluid between said first and third passages.

7. The valve of claim 1 wherein said solenoid has electrical leads constructed for connection to a source of electrical energy at an electrical port on the exterior surface of said valve, and said first, second, and third fluid passages are constructed for connection to a source and receivers of fluid at respective fluid ports on the exterior surface of said valve, said electrical and fluid ports being constructed and arranged so that upon connection of said valve to a source of electrical energy said valve becomes simultaneously connected to a source and a receiver of fluid.

8. The valve of claim 1 further comprising a manifold having ports for supplying and receiving fluid, and an electrical connector constructed to couple a source of electrical energy to at least one electrical outlet, wherein said electrical and fluid ports are constructed and arranged so that upon connection of said electrical leads to said outlet said first and second fluid passages become simultaneously connected to said supplying and receiving ports of said manifold.

9. The valve of claim 1 wherein said coupling spring is disposed around at least a portion of said armature.

10. The valve of claim 1 wherein said coupling spring and said closing spring are constructed and arranged so that their respective force tolerances do not accumulate.

11. The valve of claim 3 wherein said coupling spring is completely nested within said closing spring.

12. The valve of claim 1 wherein the armature has a wall structure defining a longitudinal passage therethrough.

13. The valve of claim 1 wherein the carrier includes two members that extend longitudinally from the fluid blocking end to a second end of the carrier and said armature includes proximal end structure for receiving the two longitudinally extending members of the carrier.

14. The valve of claim 13 wherein the proximal end structure of the armature includes an annular lip and the closing spring is disposed between the annular lip of the armature and the second end of the carrier.

15. The valve of claim 1 wherein the coupling spring is externally disposed about said armature.

16. The valve of claim 1 wherein the coupling spring and the closing spring are adjacent to one another.

17. A solenoid-actuated valve comprising:

a solenoid having an axially extending solenoid cavity;

a valve body having a first fluid passage, a second fluid passage, and a third fluid passage, said second and third fluid passages being fluidly coupled to said first fluid passage through first and second valve seats, respectively;

an axially elongated armature positioned within said cavity, said armature being axially movable within said cavity;

carrier means having end means movable against the first and second valve seats for selectively blocking the passage of fluids therepast;

closing spring means coupled between said armature and said housing for biasing said armature toward the valve seat, said closing spring means providing sufficient force to said armature to seal said first valve seat with the end means of said carrier means when said solenoid is de-energized; and coupling spring means coupled between said armature and said carrier for coupling the movement of said carrier with the movement of said armature, said coupling spring means providing sufficient force to said carrier to seal said second valve seat with the end means of said carrier means when said solenoid is energized;

wherein the flow of fluids through said first and second passages and through said first and third passages are selectively controlled by axial translation of said carrier toward and away from the first and second valve seats in response to axial translation of said armature resulting from selective energization of said solenoid.

18. The valve of claim 17 wherein said coupling spring means and said closing spring means are disposed around at least a portion of said armature.

19. The valve of claim 17 wherein at least a portion of said coupling spring means is nested within said closing spring means.

20. The valve of claim 17 wherein said coupling spring means and said closing spring means are removed from the direct passage of fluid between said first and second fluid passages and between said first and third fluid passages.

21. The valve of claim 16 wherein the armature has a wall structure defining a longitudinal passage therethrough.

22. The valve of claim 16 wherein the carrier means includes two leg means that extend longitudinally from the fluid blocking end means to a second end means of the carrier means and said armature includes proximal end structure means for receiving the two longitudinally extending leg means of the carrier.

23. The valve of claim 22 wherein the proximal end structure means of the armature includes annular lip means and the closing spring means is disposed between the annular lip means of the armature and the second end means of the carrier means.

24. The valve of claim 16 wherein the coupling spring is externally disposed about said armature.

25. The valve of claim 16 wherein the coupling spring and the closing spring are adjacent to one another.

\* \* \* \* \*